US012285785B1

(12) United States Patent
Liu et al.

(10) Patent No.: US 12,285,785 B1
(45) Date of Patent: Apr. 29, 2025

(54) PIPELINE OVERTURNING LINING INNER WALL CLEANER

(71) Applicant: China Construction Industrial & Energy Engineering Group Huanghe Construction Co., Ltd., Jinan (CN)

(72) Inventors: Changsha Liu, Jinan (CN); Chunyuan Tang, Jinan (CN); Yi Li, Jinan (CN); Jie Liu, Jinan (CN); Zhongwu Fan, Jinan (CN); Jian Qin, Jinan (CN); Yunhua Zhang, Jinan (CN)

(73) Assignee: China Construction Industrial & Energy Engineering Group Huanghe Construction Co., Ltd., Jinan (CN)

( * ) Notice: Subject to any disclaimer, the term of this patent is extended or adjusted under 35 U.S.C. 154(b) by 0 days.

(21) Appl. No.: 18/975,201

(22) Filed: Dec. 10, 2024

(30) Foreign Application Priority Data

Mar. 6, 2024 (CN) ........................ 202410250934.4

(51) Int. Cl.

| | |
|---|---|
| ***B08B 9/00*** | (2006.01) |
| ***B08B 9/02*** | (2006.01) |
| ***B08B 9/027*** | (2006.01) |
| ***B08B 9/032*** | (2006.01) |
| ***B08B 9/04*** | (2006.01) |

(52) U.S. Cl.
CPC .................................... *B08B 9/04* (2013.01); *B08B 9/00* (2013.01); *B08B 9/02* (2013.01); *B08B 9/027* (2013.01); *B08B 9/032* (2013.01)

(58) Field of Classification Search
CPC .. B08B 9/00; B08B 9/02; B08B 9/027; B08B 9/032; B08B 9/04
See application file for complete search history.

(56) References Cited

U.S. PATENT DOCUMENTS 6,470,749 B1 * 10/2002 Han ........................ G01N 29/38 73/609
2021/0245207 A1 * 8/2021 Lendi .................... B08B 9/0495

FOREIGN PATENT DOCUMENTS

CN 107470286 A * 12/2017
CN 109622526 A * 4/2019 ............ B08B 9/032
CN 116371837 A * 7/2023

(Continued)

OTHER PUBLICATIONS

Machine Translation of WO-2019041560-A1 to He, Mar. 2019. (Year: 2019).*

(Continued)

*Primary Examiner* — Benjamin L Osterhout
(74) *Attorney, Agent, or Firm* — Nitin Kaushik

(57) ABSTRACT

The present invention provides a pipeline overturning lining inner wall cleaner, belonging to the technical field of pipeline inner wall cleaning. The pipeline overturning lining inner wall cleaner includes a cleaner body, where one end of the cleaner body is fixedly connected with a fixed block, one end of an outer side of the cleaner body is provided with a first spring, one end of the first spring is fixedly connected with a sleeve, the outer side of the cleaner body and an outer side of the sleeve are fixedly connected with a rotating base, respectively, one side of each rotating base is provided with a first connecting rod, one side of each first connecting rod is provided with a second connecting rod. A water pump conveys cleaning liquid to a shunt pipe and a drain pipe, and then sprays the cleaning liquid into a pipeline.

7 Claims, 6 Drawing Sheets

(56) References Cited

FOREIGN PATENT DOCUMENTS

| | | | | | |
|---|---|---|---|---|---|
| CN | 109047200 | B | * | 8/2023 | ............. B08B 9/032 |
| CN | 116539727 | A | * | 8/2023 | |
| CN | 116586365 | A | | 8/2023 | |
| CN | 114718508 | B | * | 11/2023 | ........... E21B 23/001 |
| CN | 117135422 | A | | 11/2023 | |
| CN | 117539156 | A | | 2/2024 | |
| JP | H0557261 | A | * | 3/1993 | |
| WO | WO-9807532 | A1 | * | 2/1998 | ............. B08B 9/049 |
| WO | WO-2019041560 | A1 | * | 3/2019 | ............. B08B 9/027 |
| WO | WO-2022005866 | A1 | * | 1/2022 | .............. F16L 55/32 |

OTHER PUBLICATIONS

Machine Translation of JPH0557261A to Kurata, Mar. 1993. (Year: 1993).*

Machine Translation of CN-116539727-A to Song, Aug. 2023. (Year: 2023).*

Machine Translation of CN-116371837-A to Bian, Jul. 2023. (Year: 2023).*

Machine Translation of CN-109622526-A to Li, Apr. 2019. (Year: 2019).*

Machine Translation of CN-109047200-B to Cai, Aug. 2023. (Year: 2023).*

Machine Translation of CN-107470286-A to Zhang, Dec. 2017. (Year: 2017).*

* cited by examiner

PIPELINE OVERTURNING LINING INNER WALL CLEANER

CROSS-REFERENCE TO RELATED APPLICATIONS

The application claims priority to Chinese patent application No. 2024102509344, filed on Mar. 6, 2024, the entire contents of which are incorporated herein by reference.

TECHNICAL FIELD

The present invention belongs to the technical field of pipeline inner wall cleaning, and specifically relates to a pipeline overturning lining inner wall cleaner.

BACKGROUND

A pipeline is a device that is formed by connecting pipes, pipe fittings, valves, and other components and used for conveying gas, liquid, or fluid with solid particles. Due to its unique characteristics, the pipeline is widely used in many industries and fields. The wide use of the pipeline mainly focuses on water supply, drainage, heating, gas supply, long-distance transportation of petroleum and natural gas, agricultural irrigation, hydraulic engineering, and various industrial devices. At present, the common cleaning method is manual cleaning, which is high in labor intensity and low in overall cleaning efficiency, resulting in certain inconveniences. The Chinese invention patent with the publication No. CN114718508B discloses a pipeline inner wall cleaning robot, including an executing mechanism and a control module, where the executing mechanism includes a telescopic rod, two magnetic attraction devices, and a scraping part; a telescopic direction of the telescopic rod is parallel to an extending direction of a pipeline, and the two magnetic attraction devices are connected to two ends of the telescopic rod, respectively; the magnetic attraction devices operably generate magnetic force to be attracted to the inner wall of the pipeline; the scraping part is connected to the magnetic attraction devices, abuts against the inner wall of the pipeline, and is configured to scrape impurities on the inner wall of the pipeline; the control module is electrically connected to the executing mechanism, and is configured to send a working instruction to the executing mechanism so as to control stretching and holding of the telescopic rod and generation and disappearance of the magnetic force of the magnetic attraction devices, and then the executing mechanism can advance in and along the pipeline and perform cleaning. According to this patent, the inner wall of the pipeline can be cleaned, but the cleanliness of the pipeline cannot be judged.

When cleaning an inner wall of a pipeline in the prior art, a cleaning device needs to be taken out for checking to judge cleanliness of the inner wall of the pipeline, resulting in a serious impact on the work efficiency.

SUMMARY

In view of this, the present invention provides a pipeline overturning lining inner wall cleaner, which can solve the technical problem in the prior art that when cleaning an inner wall of a pipeline, a cleaning device needs to be taken out for checking to judge cleanliness of the inner wall of the pipeline, resulting in a serious impact on the work efficiency.

The present invention is achieved as follows:

The present invention provides a pipeline overturning lining inner wall cleaner, including a cleaner body, where one end of the cleaner body is fixedly connected with a fixed block, one end of an outer side of the cleaner body is provided with a first spring, one end of the first spring is fixedly connected with a sleeve, the outer side of the cleaner body and an outer side of the sleeve are fixedly connected with a rotating base, respectively, one side of each rotating base is provided with a first connecting rod, one side of each first connecting rod is provided with a second connecting rod, one end of each first connecting rod is provided with a bracket, one end of an interior of each bracket is symmetrically and rotatably connected with rollers, one end of each roller is fixedly connected to an output end of a first motor, the other end of the cleaner body is fixedly connected with a box body, a second motor is fixedly connected inside the box body, an output end of the second motor is fixedly connected with a rotating table, a sliding groove is disposed inside the rotating table, one side of an interior of the sliding groove is fixedly connected with a second spring, one end of the second spring is fixedly connected with a sliding block, one side of the sliding block is fixedly connected with a supporting block, one side of the supporting block is fixedly connected with a cleaning brush, a water pump is fixedly connected inside the cleaner body, a shunt pipe is fixedly connected inside the box body, one end of the shunt pipe is fixedly connected with a drain pipe, and one end of the drain pipe is fixedly connected with an atomizing nozzle.

Preferably, the other end of the first spring is fixedly connected to one side of the fixed block.

Preferably, the rotating bases, the first connecting rods, the second connecting rods, and the brackets are all rotatably connected through rotating shafts.

Preferably, an outer side of each roller is fixedly connected with a non-slip mat.

Preferably, three rotating bases, three first connecting rods, three second connecting rods, three rotating shafts, and three brackets are disposed, forming a circular shape.

Preferably, the sliding block is slidably connected inside the sliding groove, and the other end of the interior of the sliding groove is fixedly connected with a limiting block.

Preferably, a scraper is fixedly connected inside the cleaning brush.

Preferably, a water injection pipe is fixedly connected between the water pump and the shunt pipe.

Further, the inner wall cleaning judgment device includes a battery, a vibration sensor, a chip, and a communicator; the battery, the vibration sensor, the chip, and the communicator are all fixedly disposed on the inner wall of the cleaner body; the vibration sensor is electrically connected to the chip, the chip is electrically connected to the communicator, the battery is configured to supply power to the vibration sensor, the chip, and the communicator, the vibration sensor is configured to collect vibration of the inner wall of the cleaner body and transmit a vibration signal to the chip, and an inner wall cleaning judgment module that is configured to judge the cleanliness of the inner wall based on the vibration signal and transmit a cleanliness signal to an external receiving terminal through the communicator is disposed inside the chip.

The external receiving terminal is generally a smartphone APP.

The inner wall cleaning judgment module is configured to execute the following steps:

acquiring a vibration signal;

performing preprocessing including denoising, filtering, and enhancement on the vibration signal to obtain preprocessing signals;

deleting signals generated by vibration of the rotating table itself from the preprocessing signals by utilizing a frequency discrimination approach to obtain a first signal;

performing feature extraction on the first signal to acquire a first signal feature;

inputting the first signal feature into a pretrained vibration cleanliness model to output cleanliness of an inner wall of a pipeline.

Further, steps of establishing and training the vibration cleanliness model specifically include three steps: establishing a training sample, establishing a prototype model, and training the prototype model; where the step of establishing a training sample specifically includes:

acquiring a plurality of pipelines, and acquiring a vertically-shot image of an inner wall of each pipeline as a first image;

fixing different numbers of protrusions on an inner side of each pipeline, and acquiring a vertically-shot image of the inner wall of each pipeline as a second image;

taking a similarity between the second image and the first image as cleanliness;

placing the pipeline overturning lining inner wall cleaner into the pipelines for cleaning, and recording a first signal generated at this time; and taking the cleanliness obtained from a plurality of steel pipes and the first signal as the training sample;

the step of establishing a prototype model specifically includes: establishing the prototype model by using a convolutional neural network; and the step of training the prototype model specifically includes: training the prototype model by using the training sample to obtain the vibration cleanliness model.

Here, the definition of cleanliness indicates that when there are no protrusions on the inner wall of the pipeline, the similarity between the first image and the second image is 100%, and the more the protrusions, the lower the similarity. Therefore, the similarity can be used to evaluate the cleanliness.

Compared to the prior art, the pipeline overturning lining inner wall cleaner provided by the present invention has the following beneficial effects: according to the present invention, the position of the supporting block is controlled by the sliding groove; when a protrusion is disposed on the inner wall of the pipeline, the sliding groove compresses inwards; due to the rotation of the rotating table, the sliding groove elongates again after the supporting block leaves the protrusion; the vibration formed by the compression and elongation of the sliding groove has different characteristics from that of the vibration formed by the rotation of the rotating table, so the following operations can be executed to obtain the cleanliness: removing the vibration generated by the rotation of the rotating table from the vibration signals, extracting a vibration feature signal, and analyzing the vibration feature signal by using a convolutional neural network model to obtain cleanliness. Therefore, the cleanliness can be checked in real time through the external terminal without taking out the cleaner, which solves the technical problem in the prior art that when cleaning the inner wall of the pipeline, a cleaning device needs to be taken out for checking to judge the cleanliness of the inner wall of the pipeline, resulting in a serious impact on the work efficiency.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and those of ordinary skill in the art may still derive other drawings from these accompanying drawings without creative efforts.

Figure 1:
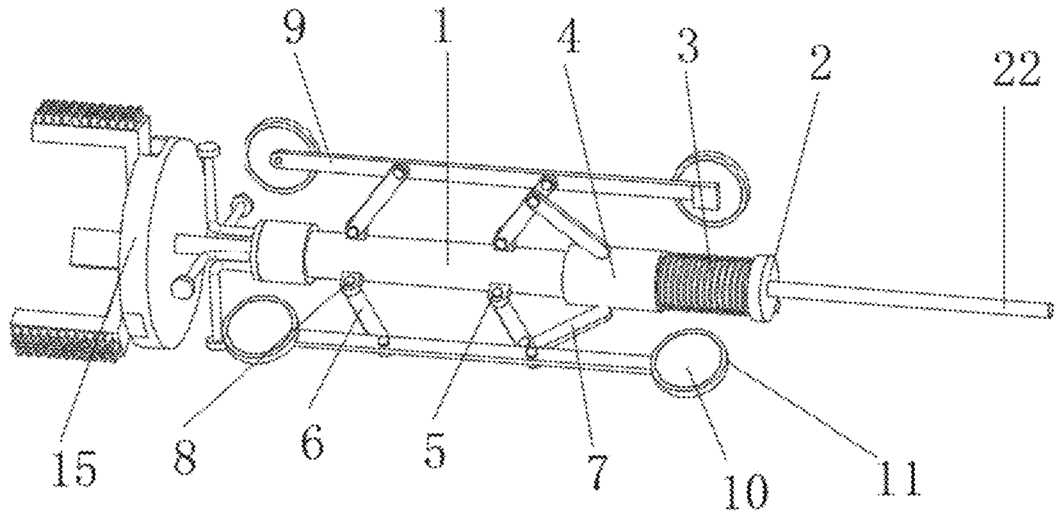
FIG. 1 is a schematic diagram of an axonometric structure of one side of a pipeline overturning lining inner wall cleaner provided by the present invention.

In the figures, parts represented by various reference numerals are listed as follows:

1. cleaner body; 10. roller; 11. non-slip mat; 12. first motor; 13. box body; 14. second motor; 15. rotating table; 16. sliding groove; 17. second spring; 18. sliding block; 19. supporting block; 2. fixed block; 20. cleaning brush; 21. limiting block; 22. water injection pipe; 23. water pump; 24. shunt pipe; 25. drain pipe; 26. atomizing nozzle; 3. first spring; 4. sleeve; 5. rotating base; 6. first connecting rod; 7. second connecting rod; 8. rotating shaft; 9. bracket; 100. inner wall cleaning judgment device.

DETAILED DESCRIPTION OF THE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. Based on the embodiments in the present invention, all other embodiments obtained by those of ordinary skill in the art without making creative efforts shall fall within the scope of protection of the present invention.

Therefore, the detailed description of the embodiments of the present invention provided in the accompanying drawings is not intended to limit the scope of the claimed invention, but only to represent selected embodiments of the present invention. Based on the embodiments in the present invention, all other embodiments obtained by those of ordinary skill in the art without making creative efforts shall fall within the scope of protection of the present invention.

It should be noted that similar reference numerals and letters refer to similar items in the following accompanying drawings, and therefore, once an item is defined in one accompanying drawing, it is not necessary to further define and explain the item in the subsequent accompanying drawings.

In the description of the present invention, it should be understood that the orientations or positional relationships indicated by the terms "center", "longitudinal", "transverse", "length", "width", "thickness", "up", "down", "front", "back", "left", "right", "vertical", "horizontal", "top", "bottom", "inside", "outside", "clockwise", "counter-clockwise", etc. are in accordance with those shown in the accompanying drawings and intended only for the convenience of describing the present invention and simplifying the description rather than for indicating or implying that the referred equipment or element must be provided with a particular orientation or constructed and operated in a particular orientation; therefore, they should not be construed as limiting the present invention.

In addition, the terms "first" and "second" are merely intended for a purpose of description, and shall not be understood as an indication or implication of relative importance or an implicit indication of the number of the indicated technical features. Therefore, features defined by "first" and "second" may explicitly or implicitly include one or more of these features. In the description of the present invention, the meaning of "plurality" is at least two, unless otherwise specifically defined.

Figure 2:
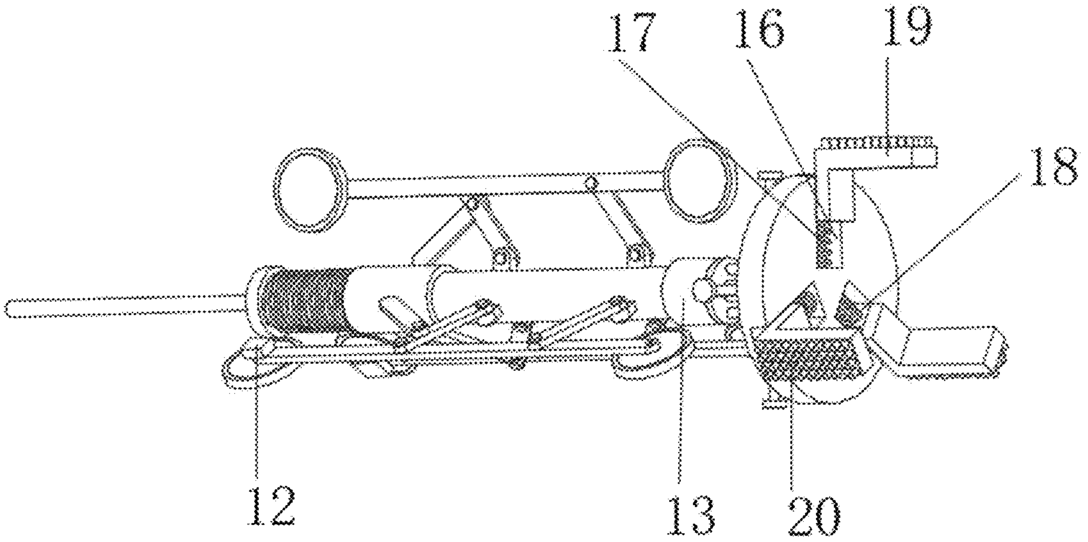
FIG. 2 is a schematic diagram of an axonometric structure of the other side of a pipeline overturning lining inner wall cleaner.
Figure 3:
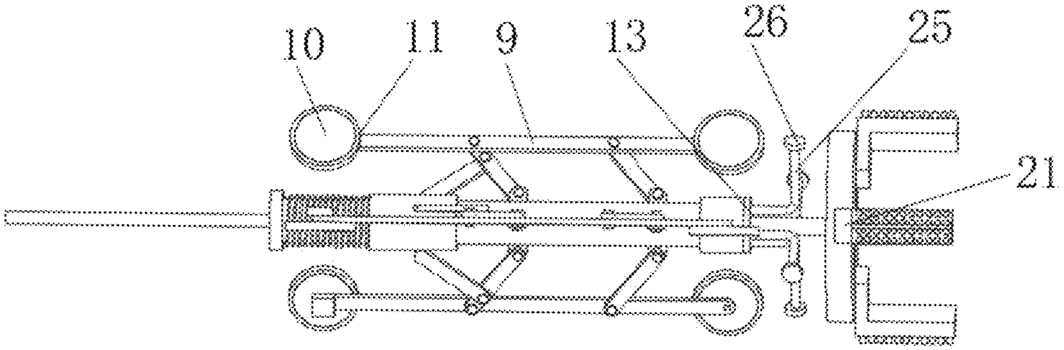
FIG. 3 is a schematic structural diagram of a front face of a pipeline overturning lining inner wall cleaner.
Figure 4:
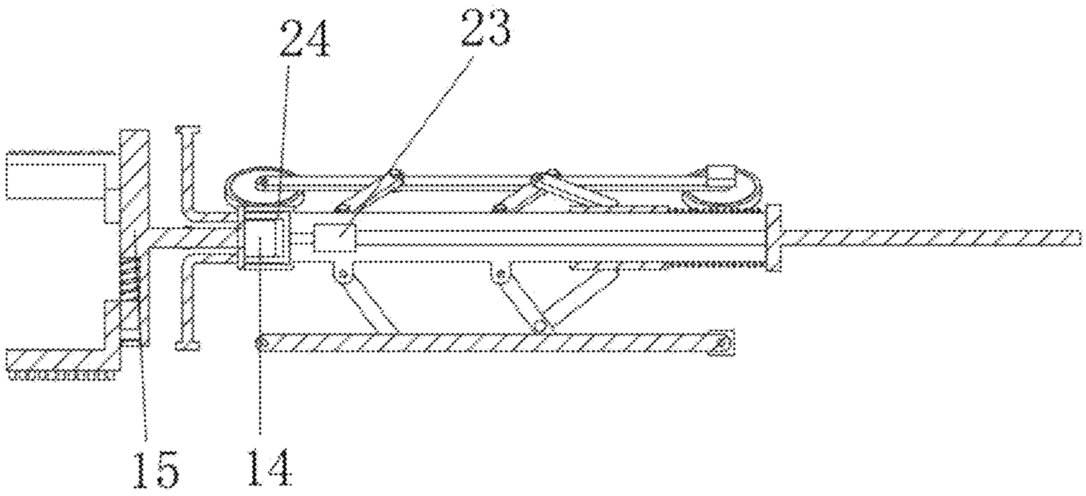
FIG. 4 is a schematic diagram of a sectional structure of a pipeline overturning lining inner wall cleaner.
Figure 5:
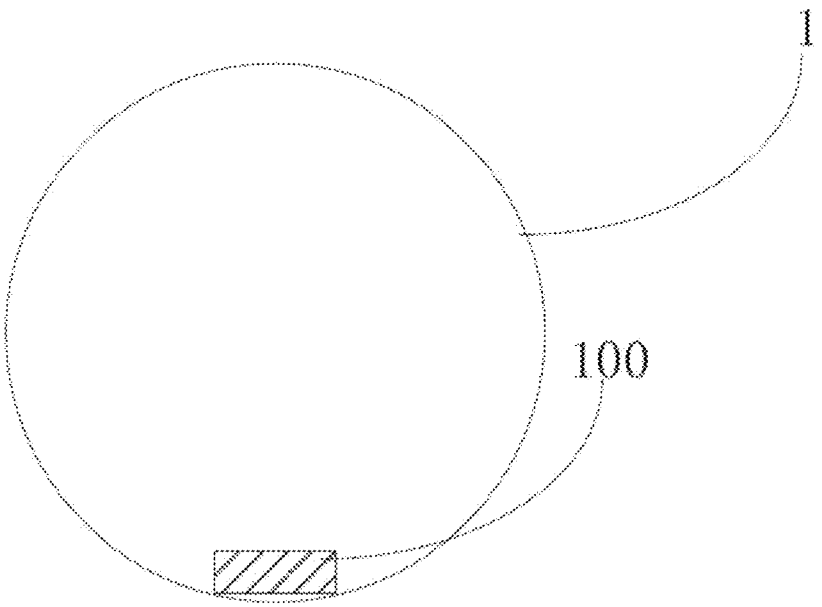
FIG. 5 is a schematic diagram of an inner wall cleaning judgment device inside a pipeline overturning lining inner wall cleaner body.
Figure 6:
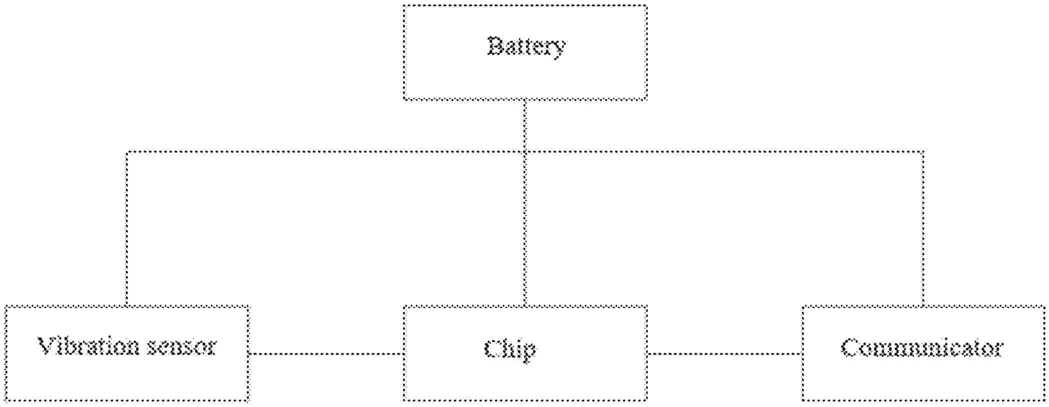
FIG. 6 is a schematic diagram of composition of an inner wall cleaning judgment device.

Referring to FIG. 1 to FIG. 4, the present invention provides a technical solution as follows: a pipeline overturning lining inner wall cleaner, including a cleaner body 1, where one end of the cleaner body 1 is fixedly connected with a fixed block 2, one end of an outer side of the cleaner body 1 is provided with a first spring 3, one end of the first spring 3 is fixedly connected with a sleeve 4, the outer side of the cleaner body 1 and an outer side of the sleeve 4 are fixedly connected with a rotating base 5, respectively, one side of each rotating base 5 is provided with a first connecting rod 6, one side of each first connecting rod 6 is provided with a second connecting rod 7, one end of each first connecting rod 6 is provided with a bracket 9, one end of an interior of each bracket 9 is symmetrically and rotatably connected with rollers 10, one end of each roller 10 is fixedly connected to an output end of a first motor 12, the other end of the cleaner body 1 is fixedly connected with a box body 13, a second motor 14 is fixedly connected inside the box body 13, an output end of the second motor 14 is fixedly connected with a rotating table 15, a sliding groove 16 is disposed inside the rotating table 15, one side of an interior of the sliding groove 16 is fixedly connected with a second spring 17, one end of the second spring 17 is fixedly connected with a sliding block 18, one side of the sliding block 18 is fixedly connected with a supporting block 19, and one side of the supporting block 19 is fixedly connected with a cleaning brush 20. By driving the first motor 12 disposed on one side of the bracket 9, the rollers 10 rotate, and thus the cleaner can be driven to move inside the pipeline immediately. The non-slip mat 11 for blocking is disposed to improve the slip resistance of the cleaner during movement. Meanwhile, external cleaning liquid is conveyed to the water pump 23 through the water injection pipe 22, is further conveyed to the shunt pipe 24 and the drain pipe 25 through the water pump 23, and then is sprayed into the interior of the pipeline. An atomizing nozzle 26 is disposed to atomize and spray the liquid, so as to fully spray the liquid onto the pipeline. After spraying is completed, a second motor 14 disposed inside a box body 13 is driven, enabling a rotating table 15 to drive a supporting block 19 and a cleaning brush 20 to rotate, and thus the interior of the pipeline can be brushed and cleaned immediately. The water pump 23 is fixedly connected inside the cleaner body 1, the shunt pipe 24 is fixedly connected inside the box body 13, one end of the shunt pipe 24 is fixedly connected with the drain pipe 25, and one end of the drain pipe 25 is fixedly connected with the atomizing nozzle 26.

Preferably, the other end of the first spring 3 is fixedly connected to one side of the fixed block 2.

Preferably, the rotating bases 5, the first connecting rods 6, the second connecting rods 7, and the brackets 9 are all rotatably connected through the rotating shafts 8.

Preferably, an outer side of each roller 10 is fixedly connected with the non-slip pad 11.

Preferably, three rotating bases 5, three first connecting rods 6, three second connecting rods 7, three rotating shafts 8, and three brackets 9 are disposed, forming a circular shape.

Preferably, the sliding block 18 is slidably connected inside the sliding groove 16, and the other end of the interior of the sliding groove 16 is fixedly connected with the limiting block 21.

Preferably, a scraper is fixedly connected inside the cleaning brush 20.

Preferably, the water injection pipe 22 is fixedly connected between the water pump 23 and the shunt pipe 24.

The working principle and use process of the present invention are as follows: when cleaning a pipeline overturning lining inner wall, the cleaner is placed inside a pipeline to be cleaned; and by driving the first motor 12 disposed on one side of the bracket 9, the rollers 10 rotate, and thus the cleaner can be driven to move inside the pipeline immediately. The non-slip mat 11 for blocking is disposed to improve the slip resistance of the cleaner during movement. Meanwhile, external cleaning liquid is conveyed to the water pump 23 through the water injection pipe 22, is further conveyed to the shunt pipe 24 and the drain pipe 25 through the water pump 23, and then is sprayed into the interior of the pipeline. An atomizing nozzle 26 is disposed to atomize and spray the liquid, so as to fully spray the liquid onto the pipeline. After spraying is completed, a second motor 14 disposed inside a box body 13 is driven, enabling a rotating table 15 to drive a supporting block 19 and a cleaning brush 20 to rotate, and thus the interior of the pipeline can be brushed and cleaned immediately, so that the operation of manually cleaning the inner wall of the pipeline can be replaced, and the convenience in cleaning the inner wall of the pipeline can be improved. During use of the pipeline overturning lining inner wall cleaner, the fixed block 2, the first spring 3, the sleeve 4, the rotating bases 5, the first connecting rods 6, the second connecting rods 7, and the brackets 9 are disposed to entirely form an expansion or contraction mechanism, so as to clean the inner walls of different pipelines. Meanwhile, the second spring 17 slidably connected inside the sliding groove 16, the sliding block 18, and the supporting block 19 can also be randomly adjusted for cleaning based on inner diameters of the pipelines, thereby effectively improving the use scope of the pipeline overturning lining inner wall cleaner.

Further, in the above technical solution, the cleaner body 1 is a hollow pipeline, and an inner wall cleaning judgment device 100 for detecting cleanliness of an inner wall is further fixedly disposed inside the cleaner body 1; the inner wall cleaning judgment device is a circuit board and is provided with a battery, a vibration sensor, a chip, and a communicator; the battery, the vibration sensor, the chip, and the communicator are all fixedly disposed on the inner wall of the cleaner body 1; the vibration sensor is electrically connected to the chip, the chip is electrically connected to the communicator, the battery is configured to supply power to the vibration sensor, the chip, and the communicator, the vibration sensor is configured to collect vibration of the inner wall of the cleaner body 1 and transmit a vibration signal to the chip, and an inner wall cleaning judgment module that is configured to judge the cleanliness of the inner wall based on the vibration signal and transmit a cleanliness signal to an external receiving terminal through the communicator is disposed inside the chip.

In the above technical solution, the inner wall cleaning judgment module is configured to execute the following steps:

acquiring a vibration signal;

performing preprocessing including denoising, filtering, and enhancement on the vibration signal to obtain preprocessing signals;

deleting signals generated by vibration of the rotating table itself from the preprocessing signals by utilizing a frequency discrimination approach to obtain a first signal;

performing feature extraction on the first signal to acquire a first signal feature;

inputting the first signal feature into a pretrained vibration cleanliness model to output cleanliness of an inner wall of a pipeline.

Further, in the above technical solution, steps of establishing and training the vibration cleanliness model specifically include three steps: establishing a training sample, establishing a prototype model, and training the prototype model; where the step of establishing a training sample specifically includes:

acquiring a plurality of pipelines, and acquiring a vertically-shot image of an inner wall of each pipeline as a first image;

fixing different numbers of protrusions on an inner side of each pipeline, and acquiring a vertically-shot image of the inner wall of each pipeline as a second image;

taking a similarity between the second image and the first image as cleanliness;

placing the pipeline overturning lining inner wall cleaner into the pipelines for cleaning, and recording a first signal generated at this time; and taking the cleanliness obtained from a plurality of steel pipes and the first signal as the training sample;

the step of establishing a prototype model specifically includes: establishing the prototype model by using a convolutional neural network; and the step of training the prototype model specifically includes: training the prototype model by using the training sample to obtain the vibration cleanliness model.

The following is a specific embodiment of the inner wall cleaning judgment module:

1. Acquisition of a Vibration Signal

A vibration sensor acquires, in real time, a vibration signal of an inner wall of the cleaner body in a form of a time domain discrete sequence x(n), where n represents a discrete time index.

2. Preprocessing

The acquired original vibration signal x(n) is preprocessed to enhance useful signals and suppress noise interference.

2.1 Denoising

Wavelet transform is used for denoising, which includes the following steps:

(1) performing wavelet transform on the signal x(n) to obtain wavelet coefficients W(s,t) at various scales:

$$W(s,t)=\Sigma_n x(n)\psi_{s,t}(n)$$

in the formula, $\psi_{s,t}(n)$ is the wavelet basis at scale s and time t, n represents a sample sequence, and N represents a maximum value;

(2) selecting an appropriate threshold λ based on a threshold processing method to suppress noise components in the wavelet coefficients:

$$\hat{W}(s,t)=\begin{cases} W(s,t), & \text{if } |W(s,t)|>\lambda \\ 0, & \text{otherwise} \end{cases}$$

(3) reconstructing denoised wavelet coefficients $\hat{W}(s,t)$ to obtain denoised signals $\hat{x}(n)$.

2.2 Filtering

A Butterworth filter is designed to achieve bandpass filtering. An expression of its transfer function is as follows:

$$H(z)=\frac{b_0+b_1z^{-1}+\ldots+b_Nz^{-N}}{1+a_1z^{-1}+\ldots+\alpha_Nz^{-N}}$$

In the expression, $b_k$, $a_k$ are filter coefficients. Through the adjustment of the coefficients, the bandpass characteristic of pass bands in $[f_1, f_2]$ is achieved, thereby preserving useful frequency components. $z^{-1}$ in the expression represents a unit delay operation and is related to the delay of time domain signals.

This transfer function contains $z^{-1}$, $z^{-2}$, and the like, indicating that an output signal is not only related to an input signal x[n], but also to a delayed input signal such as x[n−1] and x [n−2]. N is the maximum value of n.

Adaptive gain is performed on a filtered signal to highlight useful features. Specifically:

$$G[n]=\begin{cases} k, & \text{if } |\hat{x}[n]|>\theta \\ 1, & \text{otherwise} \end{cases}$$

In the formula, G[n] is a gain factor for an nth sample, k is a magnification times, and θ is a gain threshold. The final enhanced signal is:

$$x'[n]=G[n]\hat{x}[n];$$

Here, $\hat{x}[n]$ represents a signal obtained after denoising and filtering preprocessing. The adaptive gain G[n] performs nonlinear amplification on the signal to enhance the useful features.

3. Deletion of a Vibration Signal of a Rotating Table

Additional vibration interference may be introduced during operation of the rotating table. A frequency domain identification method is used to remove a rotating table signal.

Given that a range of the rotational speed of the rotating table is $n_1$, $n_2$, and the corresponding scope of characteristic frequency is $f_1$, $f_2$, then the suppression of the rotating table signal is achieved through a band-stop filter:

$$H(f)=\begin{cases} 0, & \text{if } f\in[f_1, f_2] \\ 1, & \text{otherwise} \end{cases}$$

The signal x'' (n) is obtained after filtering.

4. Feature Extraction

The time-frequency features of the vibration signal can effectively represent the conditions of the inner wall of the pipeline. According to this method, time domain features and frequency domain features are extracted to constitute a network input.

4.1 Time Domain Features

The following time domain statistical features are computed:

Mean value:

$$\mu = \frac{1}{N}\sum_{n=1}^{N} x''(n)$$

Variance:

$$\delta^2 = \frac{1}{N}\sum_{n=1}^{N} (x''(n) - \mu)^2$$

Peak factor:

$$\gamma = \frac{\max(|x''(n)|)}{\sqrt{\delta^2}}$$

Skewness:

$$\text{Skewness} = \frac{\sum_{n=1}^{N} (x''(n) - \mu)^3 / N}{\delta^3}$$

Kurtosis:

$$\text{Kurtosis} = \frac{\sum_{n=1}^{N} (x''(n) - \mu)^4 / N}{\delta^4} - 3$$

4.2 Frequency Domain Features

The frequency domain features are acquired using Fourier transform:

$$X(f) = x''(n)e^{-j2\pi fn}$$

The following frequency domain features are extracted:

Principal frequency:

$$f_m = \arg_f^{max}|X(f)|$$

Frequency center:

$$f_c = \frac{\sum_f f|X(f)|}{\sum_f |X(f)|}$$

Band energy ratio:

$$E_r = \frac{\sum_{f\in B} |X(f)|}{\sum_f |X(f)|}$$

In the formulas, B represents a feature band around the principal frequency.

5. Cleanliness Evaluation

The cleanliness evaluation is performed based on a convolutional neural network (CNN).

The specific structure of the convolutional neural network used is as follows:

Input Layer

The input to the input layer is a vector composed of the time domain features and the frequency domain features extracted in the previous step, assuming the dimension as D, i.e., the input to the input layer is a D-dimensional vector x.

Convolutional Layer

The convolutional layer is used to extract the correlation between the time domain features and the frequency domain features. Two convolutional layers are used in this method.

The input of a first convolutional layer is an output x of the input layer, the number of channels for output feature maps is set to $C_1$, the size of a convolution kernel is $K_1 \times D$, and an activation function adopts ReLU. Then, the output of the first convolutional layer is a feature map with a size $C_1$, represented as $F_1$.

The input of a second convolutional layer is an output $F_1$ of the first convolutional layer, the number of channels for output feature maps is set to $C_2$, the size of a convolution kernel is $K_2 \times C_1$, and an activation function adopts ReLU. Then, the output of the second convolutional layer is a feature map with a size $C_2$, represented as $F_2$.

Pooling Layer

The pooling layer is used to reduce feature dimensions. A maximum pooling layer is added after each convolutional layer, and the size of pooling windows is set to $P_1$ and $P_2$, respectively. Then, the output of the first maximum pooling layer is the output $F_2$ of the second convolutional layer.

Fully-Connected Layer

The feature map is reduced to one dimension, and then is connected to the output layer. Two fully-connected layers are added with node numbers of $N_1$ and $N_2$, respectively.

The input of a first fully-connected layer is the output of a second pooling layer, and the output of a second fully-connected layer is the output of the first fully-connected layer.

Softmax Layer

The Softmax normalization function represents the probability of each category. The input thereof is the output of the second fully-connected layer and the output dimension thereof is the category M of the cleanliness grade of the pipeline.

Argmax Layer

The category with a maximum probability is selected as the result of the cleanliness evaluation.

According to the present invention, the cleaner body, the rollers, the non-slip mat, the box body, the second motor, the rotating table, the supporting block, the cleaning brush, the water injection pipe, the water pump, the shunt pipe, the rotating table, and the atomizing nozzle are disposed. When cleaning a pipeline overturning lining inner wall, the cleaner is placed inside a pipeline to be cleaned; and by driving the first motor disposed on one side of the bracket, the rollers rotate, and thus the cleaner can be driven to move inside the pipeline immediately. The non-slip mat for blocking is disposed to improve the slip resistance of the cleaner during movement. Meanwhile, external cleaning liquid is conveyed to the water pump through the water injection pipe, is further conveyed to the shunt pipe and the drain pipe through the water pump, and then is sprayed into the interior of the pipeline. The atomizing nozzle is disposed to atomize and spray the liquid, so as to fully spray the liquid onto the pipeline. After spraying is completed, the second motor disposed inside the box body is driven, enabling the rotating table to drive the supporting block and the cleaning brush to rotate, and thus the interior of the pipeline can be brushed and cleaned immediately, so that the operation of manually cleaning the inner wall of the pipeline can be replaced, and the convenience in cleaning the inner wall of the pipeline can be improved.

The fixed block, the first spring, the sleeve, the rotating bases, the first connecting rods, the second connecting rods, the brackets, the rotating table, the sliding groove, the second spring, the sliding block, the supporting block, and the cleaning brush are disposed. During use of the pipeline overturning lining inner wall cleaner, the fixed block, the first spring, the sleeve, the rotating bases, the first connecting rods, the second connecting rods, and the brackets are disposed to entirely form an expansion or contraction mechanism, so as to clean the inner walls of different pipelines. Meanwhile, the second spring slidably connected inside the sliding groove, the sliding block, and the supporting block can also be randomly adjusted for cleaning based on inner diameters of the pipelines, thereby effectively improving the use scope of the pipeline overturning lining inner wall cleaner.

During use, an operator can check cleanliness of the pipeline at all times through an external terminal such as a smartphone APP without taking out the cleaner.

The above is only the specific embodiments of the present invention, but the scope of protection of the present invention is not limited thereto. Any changes or replacements that can be easily thought by those skilled in the art within the scope of disclosure of the present invention shall fall within the scope of protection of the present invention. Therefore, the scope of protection of the present invention shall be subject to the scope of protection of the appended claims.

What is claimed is:

1. A pipeline overturning lining inner wall cleaner, comprising a cleaner body (1), wherein one end of the cleaner body (1) is fixedly connected with a fixed block (2), one end of an outer side of the cleaner body (1) is provided with a first spring (3), one end of the first spring (3) is fixedly connected with a sleeve (4), the outer side of the cleaner body (1) is fixedly connected with a rotating base (5), one side of the rotating base (5) is provided with a first connecting rod (6), one side of the first connecting rod (6) is provided with a second connecting rod (7), the second connecting rod (7) is connected with an outer side of the sleeve (4), one end of the first connecting rod (6) is provided with a bracket (9), two ends of the bracket (9) are symmetrically and rotatably connected with rollers (10), one end of each roller (10) is fixedly connected to an output end of a first motor (12), the other end of the cleaner body (1) is fixedly connected with a box body (13), a second motor (14) is fixedly connected inside the box body (13), an output end of the second motor (14) is fixedly connected with a rotating table (15), a sliding groove (16) is disposed inside the rotating table (15), one side of an interior of the sliding groove (16) is fixedly connected with a second spring (17), one end of the second spring (17) is fixedly connected with a sliding block (18), one side of the sliding block (18) is fixedly connected with a supporting block (19), one side of the supporting block (19) is fixedly connected with a cleaning brush (20), a water pump (23) is fixedly connected inside the cleaner body (1), a shunt pipe (24) is fixedly connected inside the box body (13), one end of the shunt pipe (24) is fixedly connected with a drain pipe (25), and one end of the drain pipe (25) is fixedly connected with an atomizing nozzle (26); the cleaner body is a hollow pipeline, and an inner wall cleaning judgment device for detecting cleanliness of an inner wall is further fixedly disposed inside the cleaner body; the inner wall cleaning judgment device comprises a battery, a vibration sensor, a chip, and a communicator; the battery, the vibration sensor, the chip, and the communicator are all fixedly disposed on the inner wall of the cleaner body; the vibration sensor is electrically connected to the chip, the chip is electrically connected to the communicator, the battery is configured to supply power to the vibration sensor, the chip, and the communicator, the vibration sensor is configured to collect vibration of the inner wall of the cleaner body and transmit a vibration signal to the chip, and an inner wall cleaning judgment module that is configured to judge the cleanliness of the inner wall based on the vibration signal and transmit a cleanliness signal to an external receiving terminal through the communicator is disposed inside the chip; and the inner wall cleaning judgment module is configured to execute the following steps:

acquiring the vibration signal of the inner wall of the cleaner body;

performing preprocessing including denoising, filtering, and enhancement on the vibration signal to obtain preprocessing signals;

deleting signals generated by vibration of the rotating table itself from the preprocessing signals by utilizing a frequency discrimination approach to obtain a first signal;

performing feature extraction on the first signal to acquire a first signal feature;

inputting the first signal feature into a pretrained vibration cleanliness model to output cleanliness of an inner wall of a pipeline; wherein steps of establishing and training the vibration cleanliness model specifically comprise three steps: establishing a training sample, establishing a prototype model, and training the prototype model;

the step of establishing a training sample specifically comprises:

acquiring a plurality of pipelines, and acquiring a vertically-shot image of an inner wall of each pipeline as a first image;

fixing different numbers of protrusions on an inner side of each pipeline, acquiring a vertically-shot image of the inner wall of each pipeline as a second image, determining a similarity between the second image and the first image, and using the similarity as cleanliness;

placing the pipeline overturning lining inner wall cleaner into the pipelines for cleaning, and recording a first signal generated at this time; and taking the cleanliness obtained from a plurality of steel pipes and the first signal as the training sample;

the step of establishing a prototype model specifically comprises: establishing the prototype model by using a convolutional neural network; and the step of training the prototype model specifically comprises: training the prototype model by using the training sample to obtain the vibration cleanliness model.

2. The pipeline overturning lining inner wall cleaner according to claim 1, wherein the other end of the first spring (3) is fixedly connected to one side of the fixed block (2).

3. The pipeline overturning lining inner wall cleaner according to claim 2, wherein the rotating bases (5), the first connecting rods (6), the second connecting rods (7), and the brackets (9) are all rotatably connected through rotating shafts (8).

4. The pipeline overturning lining inner wall cleaner according to claim 3, wherein an outer side of each roller (10) is fixedly connected with a non-slip mat (11).

5. The pipeline overturning lining inner wall cleaner according to claim 4, wherein three rotating bases (5), three first connecting rods (6), three second connecting rods (7), three rotating shafts (8), and three brackets (9) are disposed, forming a circular shape.

6. The pipeline overturning lining inner wall cleaner according to claim 5, wherein the sliding block (18) is slidably connected inside the sliding groove (16), and the other end of the interior of the sliding groove (16) is fixedly connected with a limiting block (21).

7. The pipeline overturning lining inner wall cleaner according to claim 6, wherein a scraper is fixedly connected inside the cleaning brush (20), and a water injection pipe (22) is fixedly connected between the water pump (23) and the shunt pipe (24).

* * * * *